(12) United States Patent
Hsu et al.

(10) Patent No.: US 8,054,613 B2
(45) Date of Patent: Nov. 8, 2011

(54) SUPPORTING DEVICE AND A PORTABLE ELECTRONIC DEVICE

(75) Inventors: Hsin-Hui Hsu, Taipei Hsien (TW); Bau-Yi Huang, Taipei Hsien (TW)

(73) Assignee: Wistron Neweb Corp., Taipei Hsien (TW)

( * ) Notice: Subject to any disclaimer, the term of this patent is extended or adjusted under 35 U.S.C. 154(b) by 127 days.

(21) Appl. No.: 12/385,477

(22) Filed: Apr. 9, 2009

(65) Prior Publication Data
US 2010/0007251 A1     Jan. 14, 2010

(30) Foreign Application Priority Data
Jul. 11, 2008 (TW) .............................. 97126444 A

(51) Int. Cl.
*H05K 7/16* (2006.01)
(52) U.S. Cl. .................. 361/679.01; 361/679.3; 345/179
(58) Field of Classification Search ............ 361/679.02, 361/679.09, 679.1, 679.18, 679.3, 679.56, 361/679.01; 345/179, 184, 905; 248/451, 248/351; 312/223.1
See application file for complete search history.

(56) References Cited

U.S. PATENT DOCUMENTS

| 5,179,502 | A  | * | 1/1993  | Matsuda ................. 361/679.3 |
| 7,138,977 | B2 | * | 11/2006 | Kinerk et al. ............. 345/156 |
| 7,425,948 | B2 | * | 9/2008  | Ling et al. ............... 345/179 |
| 2006/0094464 | A1 | * | 5/2006 | Kyou et al. ............. 455/556.1 |
| 2008/0238888 | A1 | * | 10/2008 | Chen et al. ............... 345/179 |

FOREIGN PATENT DOCUMENTS
DE            20319783 U1  *  6/2004
* cited by examiner

*Primary Examiner* — Jinhee J Lee
*Assistant Examiner* — Ingrid Wright
(74) *Attorney, Agent, or Firm* — Bacon & Thomas, PLLC

(57) ABSTRACT

A supporting device of the invention comprises a main body, a shaft, and a rotating component. The main body comprises a sliding path and an opening. The shaft and the rotating component can slide along the sliding path. The rotating component is connected to the shaft. The shaft and at least a part of the rotating component can then be extended beyond the main body through the opening. Through the aforementioned configuration, the shaft can rotate with respect to the main body when the shaft and at least a part of the rotating component are extended beyond the main body.

11 Claims, 15 Drawing Sheets

SUPPORTING DEVICE AND A PORTABLE ELECTRONIC DEVICE

BACKGROUND OF THE INVENTION

1. Field of the Invention

The present invention relates to a supporting device and a portable electronic device, and more particularly, to a supporting device which can be used either as a touch pen or a supporting leg, as well as a portable electronic device which comprises the supporting device.

2. Description of the Related Art

There are various types of portable electronic devices which consist of a touch screen, so a touch pen slot and a touch pen are often included in the casings of these devices. Furthermore, some portable electronic devices also comprise a supporting leg so that these electronic devices can be erected on the desktop.

However, the touch pen and the supporting leg are two separate items which exist for singular purposes; therefore, the touch pen and the supporting leg are included as separate items if the portable electronic device is to have both functionalities. This both increases the manufacturing cost and also affects the exterior appearance of the electronic device.

Therefore, a portable electronic device and a supporting device which combine the functionality of a touch pen and a supporting leg are needed to solve the problems in the prior art.

SUMMARY OF THE INVENTION

The object of the present invention is to provide a supporting device which comprises the functionality of a touch pen and a supporting leg.

Another object of the present invention is to provide a portable electronic device comprising the abovementioned supporting device, wherein the supporting device comprises the functionality of a touch pen and a supporting leg.

In order to achieve the first objective, the invention provides a supporting device, which comprises a main body, a shaft, and a rotating component. The main body comprises a sliding path and an opening. The shaft and the rotating component can slide along the sliding path. The rotating component is connected to the shaft. The shaft and at least a part of the rotating component can be extended beyond the main body through the opening. Through the aforementioned configuration, the shaft can rotate with respect to the main body when the shaft and at least a part of the rotating component are extended beyond the main body.

To achieve the second objective of the invention, a portable electronic device comprising a supporting device is provided. The supporting device comprises a main body, a shaft, and a rotating component. The main body comprises a sliding path as well as an opening. The shaft and the rotating component can then be slid along the sliding path. The rotating component is connected to the shaft. The shaft and at least a part of the rotating component can be extended beyond the main body through the opening. Through the aforementioned configuration, the shaft can rotate in opposition to the main body when the shaft and at least a part of the rotating component are extended beyond the main body.

DETAILED DESCRIPTION OF THE PREFERRED EMBODIMENT

The advantages and innovative features of the invention will become more apparent from the following preferred embodiments.

Figure 1:
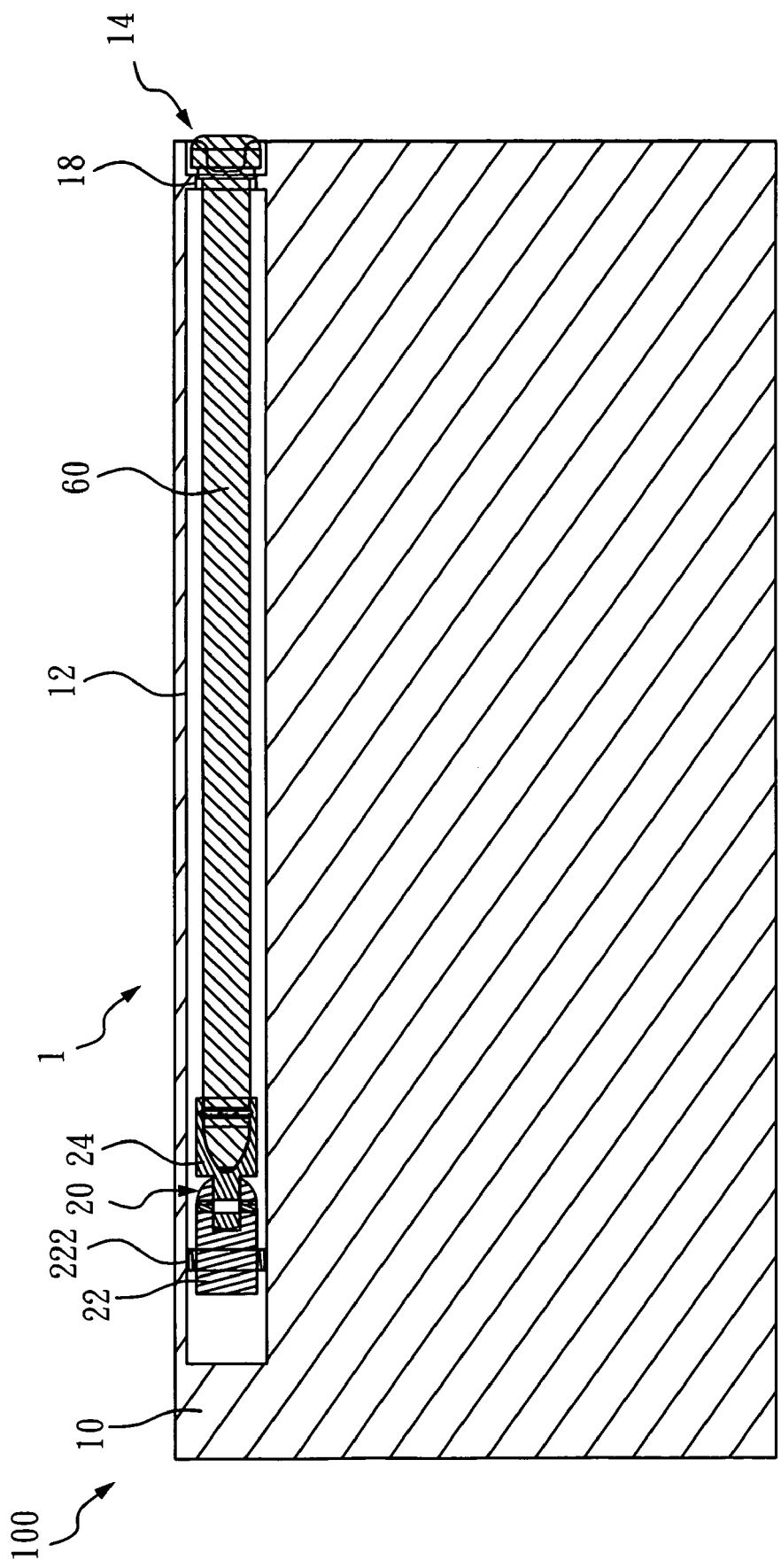
FIG. 1 is a cutaway view of a supporting device of the first embodiment of the invention.
Figure 2:
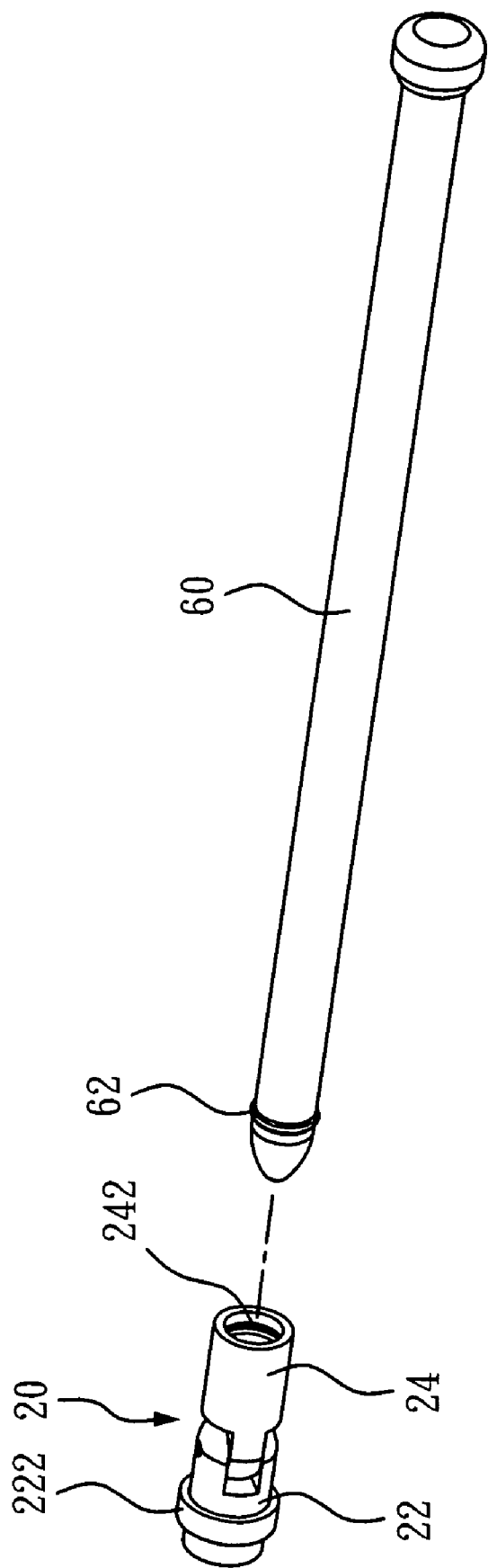
FIG. 2 is a disassembled diagram of a rotating component and a shaft of the first embodiment of the invention.
Figure 3:
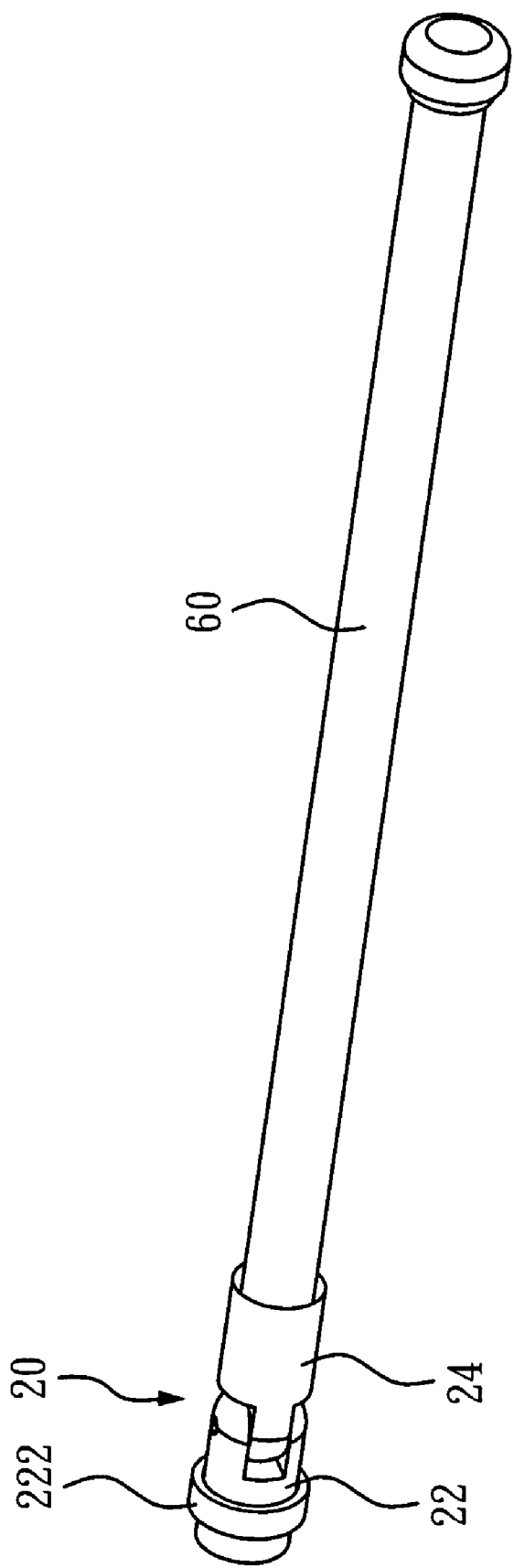
FIG. 3 is a 3-D diagram of the first embodiment of the invention, showing a rotating component and a shaft.

Refer to FIG. 1 to FIG. 3. FIG. 1 is a cutaway view of a supporting device of the first embodiment of the invention. FIG. 2 is a disassembled diagram of a rotating component and a shaft of the first embodiment of the invention. FIG. 3 is a 3-D diagram of the first embodiment of the invention, showing a rotating component and a shaft.

Supporting device 1 can be used in the portable electronic device 100. The supporting device 1 comprises a main body 10, a shaft 60 and a rotating component 20. In the embodiment, the shaft 60 is a touch pen, and the main body 10 is a casing of an electronic device.

The main body 10 comprises a sliding path 12 and an opening 14. The sliding path 12 extends along the main body 10 from the opening 14, forming a long narrow slot with a round cross-section.

The shaft 60 consists of two functionalities. It can be used either as a touch pen or as a supporting leg. When it is not in use, the shaft 60 can be inserted into the opening 14 and slide along the sliding path 12 so that the shaft 60 can reside in the sliding path 12. The tip of the touch pen of the shaft 60 consists of a locking section 62, which is used to prevent the shaft 60 from moving when it is inside the sliding path 12. In the embodiment, the locking section 62 is formed by a ring-shaped protruding structure, but the locking section 62 is not limited only to this shape.

The rotating component 20 can slide along the sliding path 12, and the clipping section 242 of the rotating component 20 can be clip-fastened with the locking section 62 of the shaft 60. The rotating component 20 is slightly cylindrical and comprises a first rotating unit 22 and a second rotating unit 24. The purpose of the first rotating unit 22 and the second rotating unit 24 are to provide freedom in the angle of rotation, wherein the external surface 222 of the first rotating unit 22 fits with the internal diameter of the sliding path 12 such that the first rotating unit 22 can slide and rotate within the sliding path 12. The second rotating unit 24 can rotate with respect to the first rotating unit 22, and an included angle is formed between the second rotating unit 24 and the first rotating unit 22. The second rotating unit 24 comprises a clipping section 242, whereas the clipping section 242 and the locking section 62 can be held together by the locking effect of the protruding ring and the groove shape (as shown in FIG. 2). In the embodiment, the clipping section 242 is formed by a ring-shaped groove.

The shaft 60 is connected to the second rotating unit 24, and it can be extended as a supporting leg. In order to increase the stability of the supporting leg, the first rotating unit 22 of the invention can be tightly joined with the second rotating unit 24 so that the shaft 60 can be fixed in a desired supporting position.

Take note that besides the configuration of the mentioned rotating component 20, freedom in the angle of rotation can also be achieved by using a universal joint or a ball joint.

Figure 4:
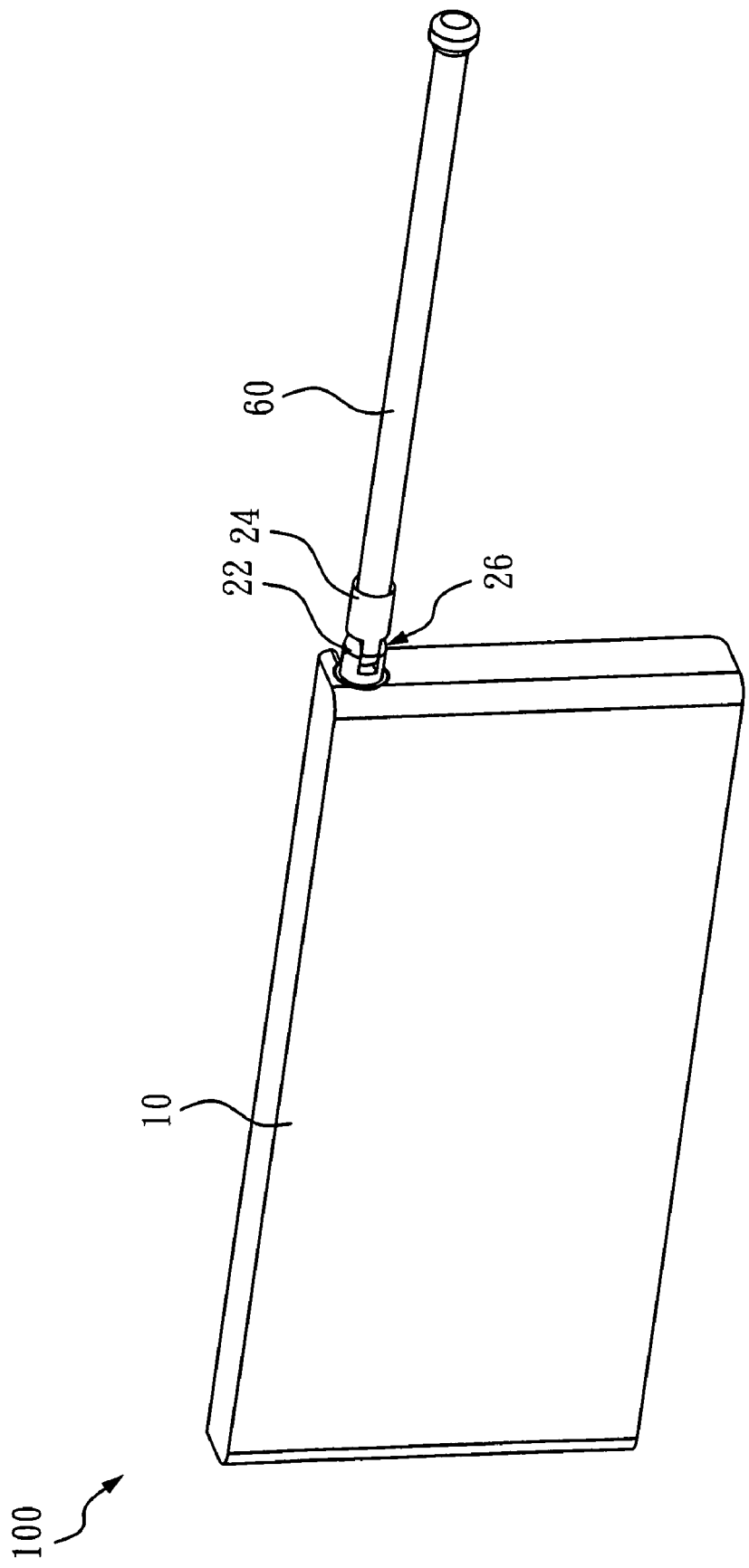
FIG. 4 is a 3-D diagram of the first embodiment of the invention, showing a shaft extended beyond the main body.
Figure 5:
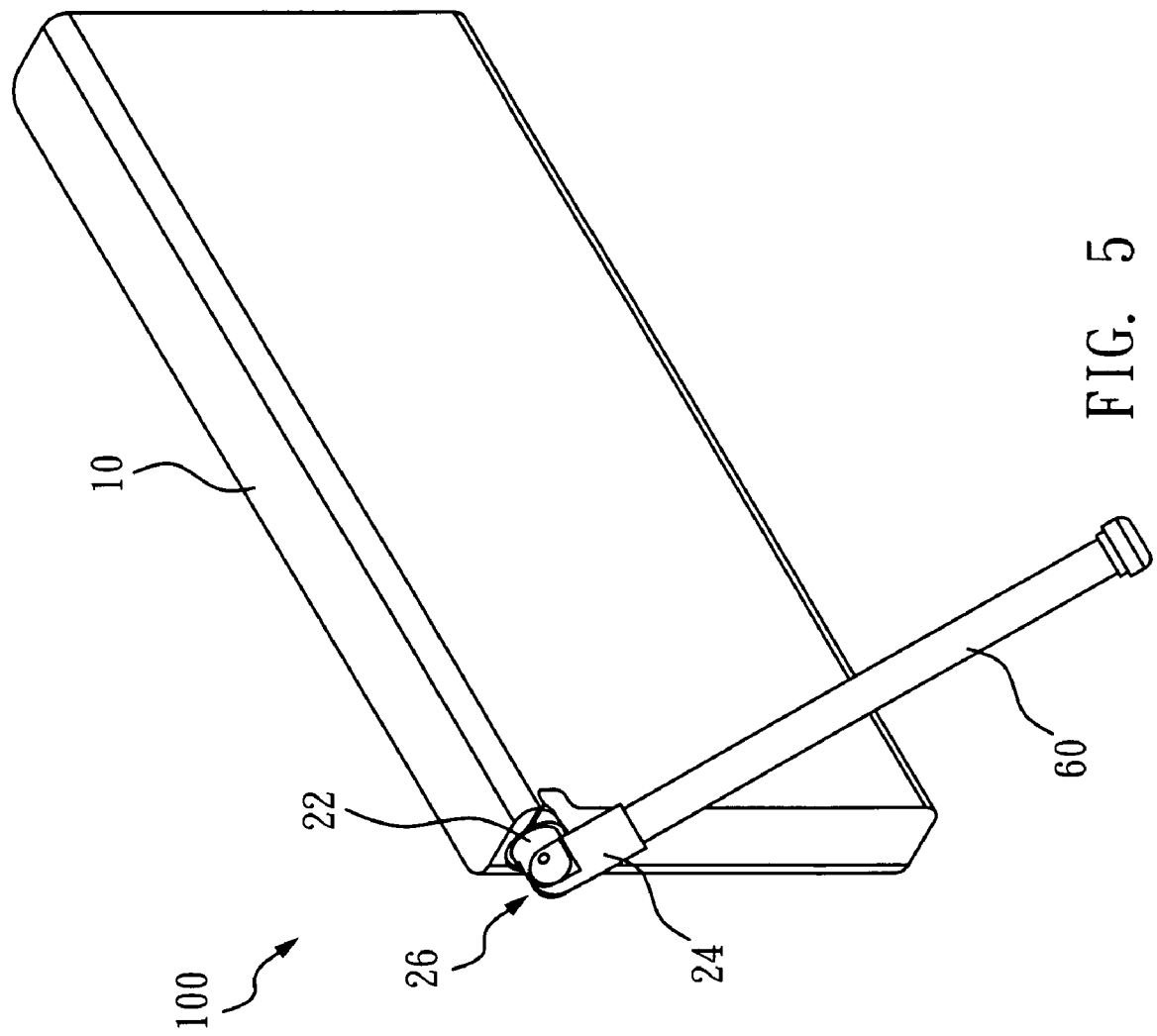
FIG. 5 is a 3-D diagram of the first embodiment of the invention, showing a shaft which is used as a supporting leg.

The following section describes the method of using the supporting device 1. Refer to FIG. 4 and FIG. 5. FIG. 4 is a 3-D diagram of the first embodiment of the invention, showing a shaft extended beyond the main body. FIG. 5 is a 3-D diagram of the first embodiment of the invention, showing a shaft which is used as a supporting leg.

When the user requires the use of the shaft 60 as a touch pen, the locking effect between the locking section 62 of the shaft 60 and the clipping section 242 of the rotating component 20 must be separated. When they are separated, the shaft 60 can be slid out from the sliding path 12 until the external surface 222 of the first rotating unit 22 is blocked by the blocking section 18, wherein the first rotating unit 22 is still inside the sliding path 12. The shaft 60 can be used as a touch pen by pulling it out from the second rotating unit 24.

When the user requires the use of the shaft 60 as a supporting leg, the shaft 60 and the rotating component 20 can slide along the sliding path 12 and exit from the opening 14 (as shown in FIG. 4). When the shaft 60 and part of the rotating component 20 are extended beyond the main body 10, the shaft 60 will no longer be restrained by the sliding path 12 and thus will be able to rotate freely with respect to the main body 10, which will then form an included angle between the shaft 60 and the first rotating unit 22 (as shown in FIG. 5). Due to the fact that the first rotating unit 22 and the second rotating unit 24 rotate in different directions, the user can adjust the shaft 60 in order to erect the main body 10 on a table at a desired angle.

Figure 6:
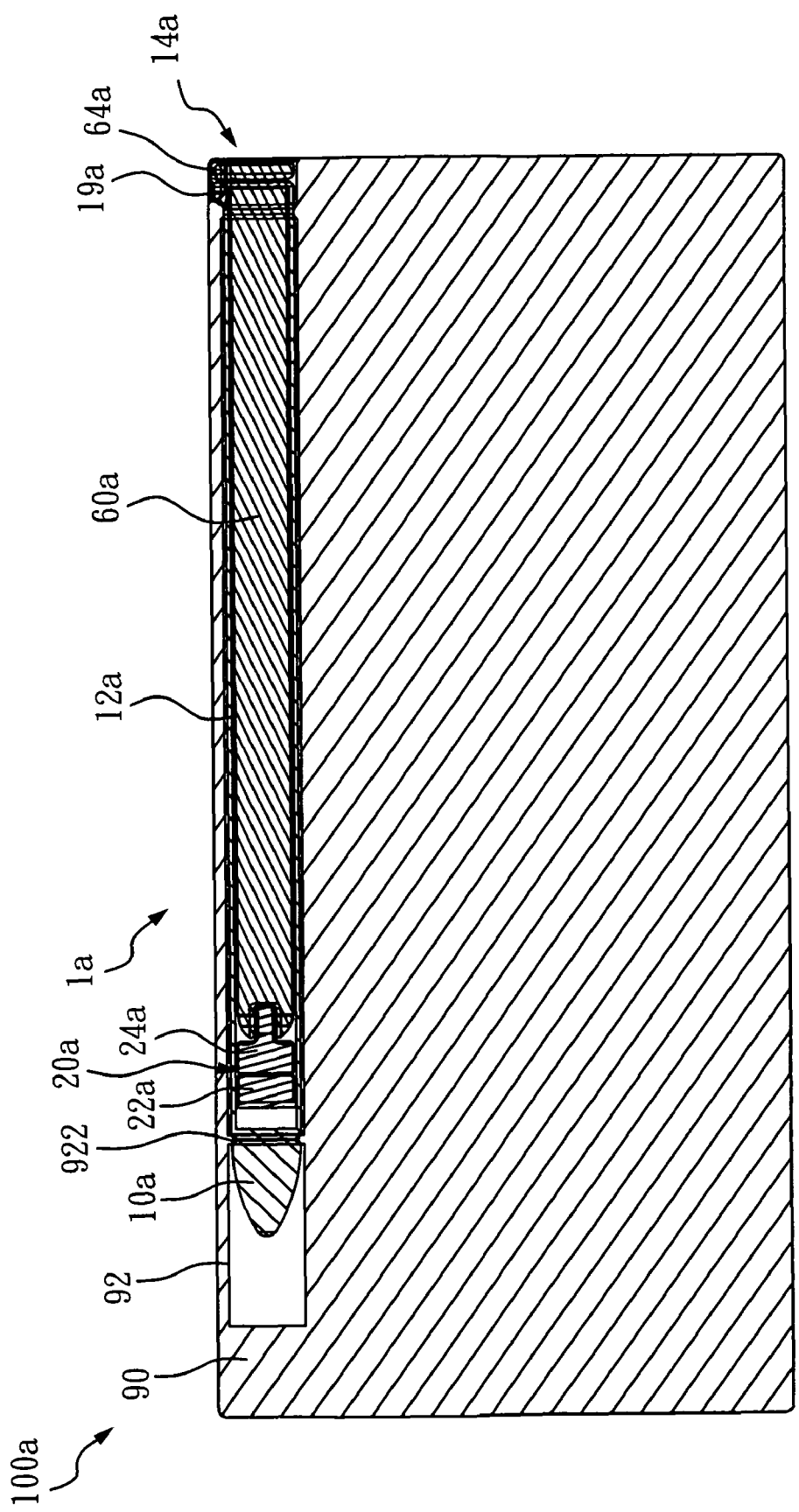
FIG. 6 shows a cutaway view of the second embodiment of the supporting device.
Figure 7:
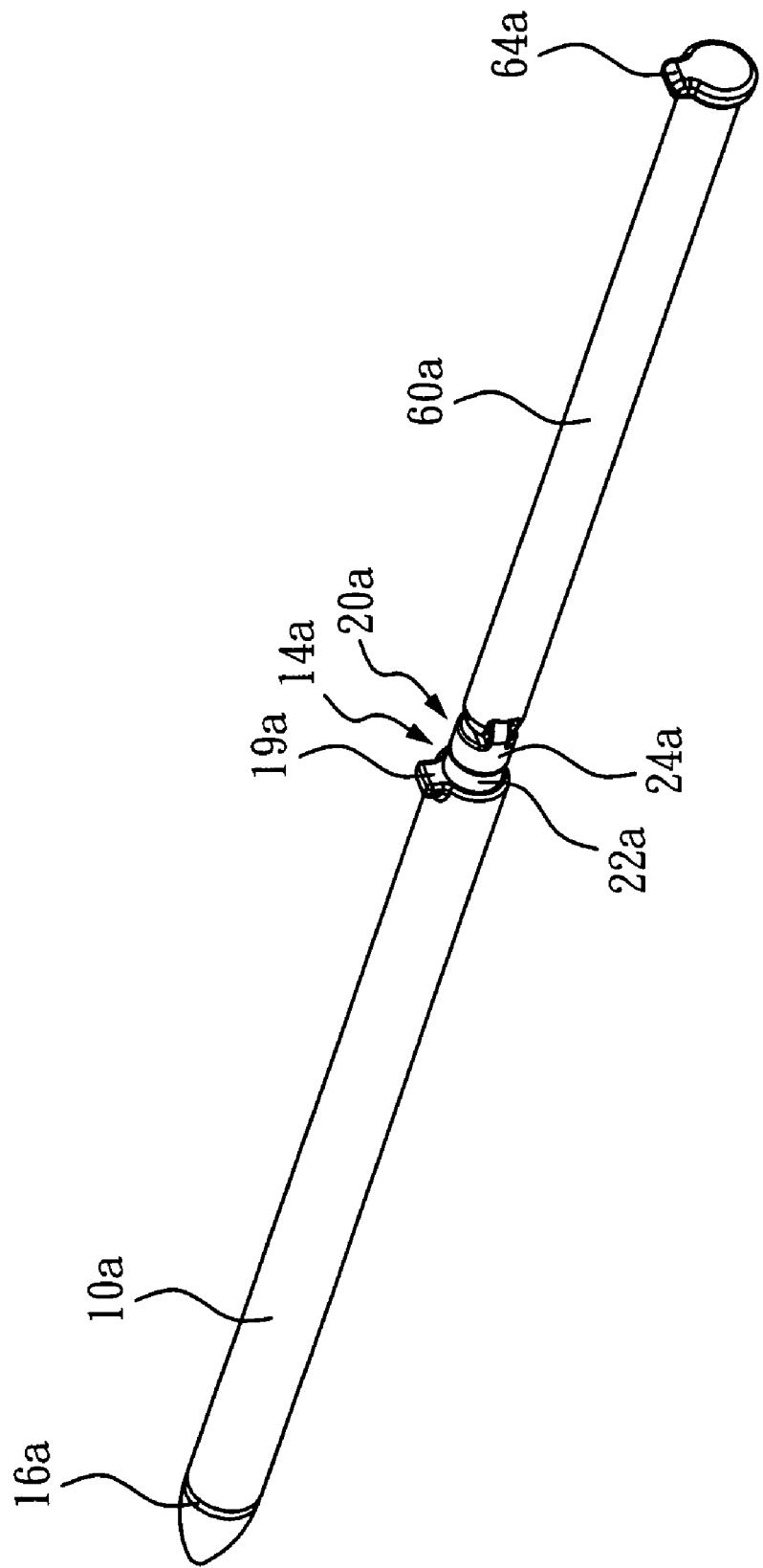
FIG. 7 shows a 3-D diagram of the second embodiment of the main body and the shaft.

Next, refer to FIG. 6 and FIG. 7. FIG. 6 shows a cutaway view of the second embodiment of the supporting device. FIG. 7 shows a 3-D diagram of the second embodiment of the main body and the shaft.

The supporting device 1a can be used with the portable electronic device 100a. The supporting device 1a comprises an electronic device casing 90, a main body 10a, a shaft 60a, and a rotating component 20a. In the first embodiment, the shaft 60 can slide within the main body 10 along the sliding path 12. By the same principle, the shaft 60a can also slide within the main body 10a along the sliding path 12a, but these components have a different function from the first embodiment. In the embodiment, the shaft 60a is a supporting leg and the main body 10a is a touch pen.

The electronic device casing 90 comprises a slot 92. The main body 10a can slide along the slot 92; the slot 92 comprises a clipping section 922.

Internally, the main body 10a comprises a sliding path 12a and an opening 14. Externally, the main body 10a comprises a locking section 16a, which can be locked with the clipping section 922 of the slot 92 in order to hold the main body 10a in a fixed position.

The shaft 60a and the rotating component 20a can slide along the sliding path 12a; the rotating component 20a is pivoted to the shaft 60a and cannot be separated from it. Shaft 60a can slide within the main body 10a; the shaft 60a and part of the rotating component 20a can be extended beyond the main body 10a through the opening 14a.

The rotating component 20a comprises a first rotating unit 22a and a second rotating unit 24a, where the first rotating unit 22a can slide along the sliding path 12a and the second rotating unit 24a can rotate with respect to the first rotating unit 22a; the shaft 60a can also rotate with respect to the second rotating unit 24a. In the embodiment, the second rotating unit 24a is tightly joined with the shaft 60a. Take note that the rotating component 20a can also be replaced by a universal joint or a ball joint to achieve rotational freedom.

Figure 8:
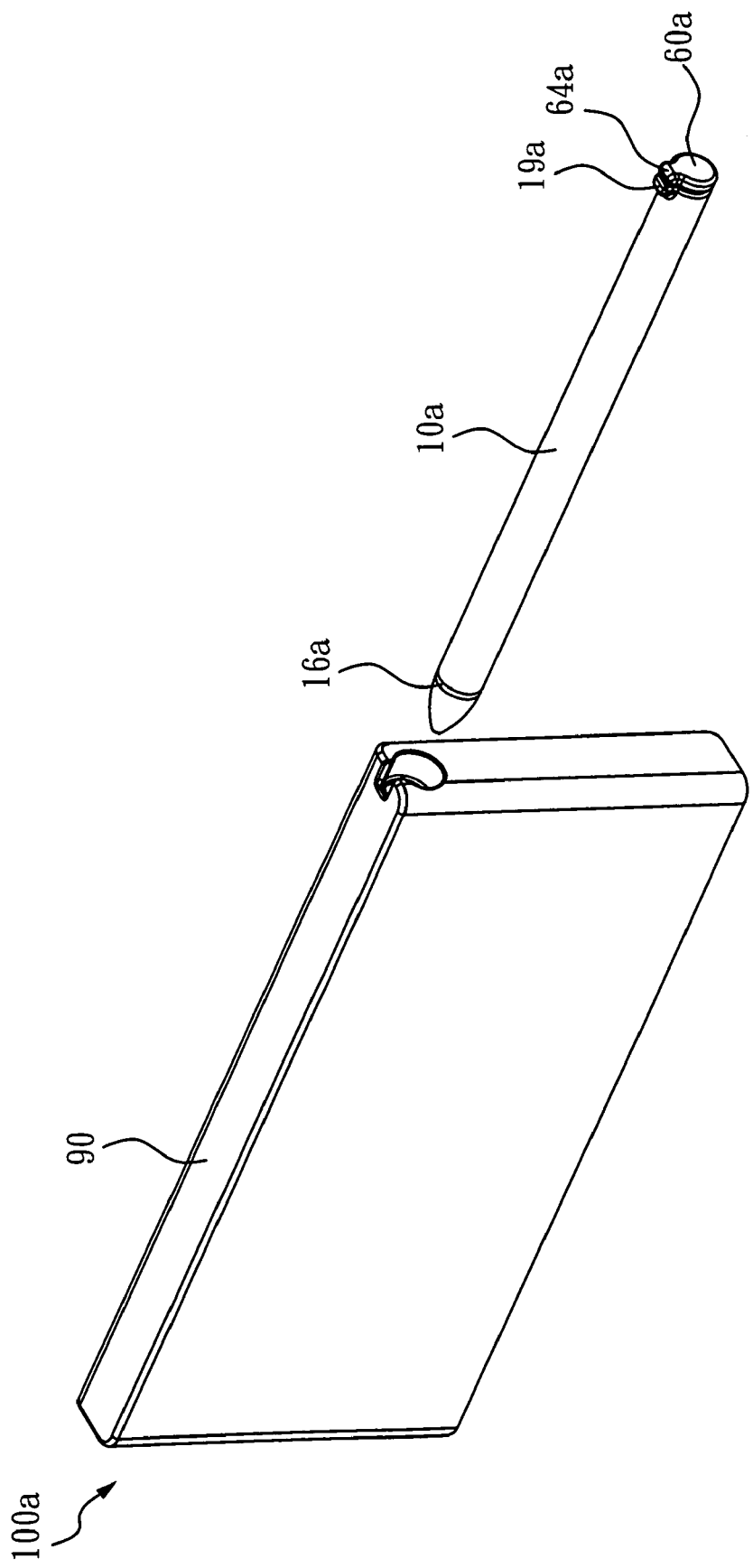
FIG. 8 is a 3-D diagram of the second embodiment of the invention which shows the main body being used as a touch pen.
Figure 9:
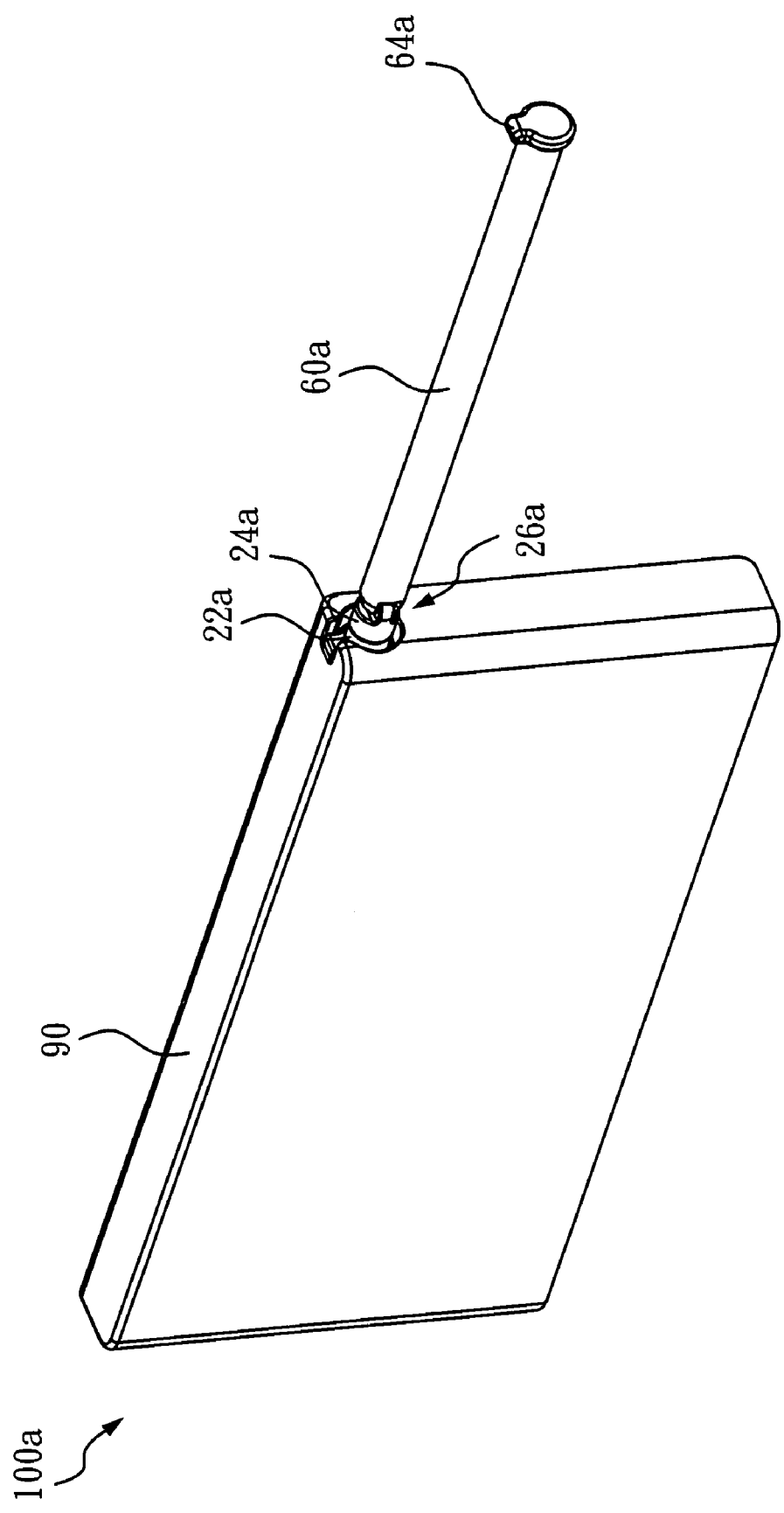
FIG. 9 is a 3-D diagram of the second embodiment of the invention which shows a shaft extended beyond the main body.
Figure 10:
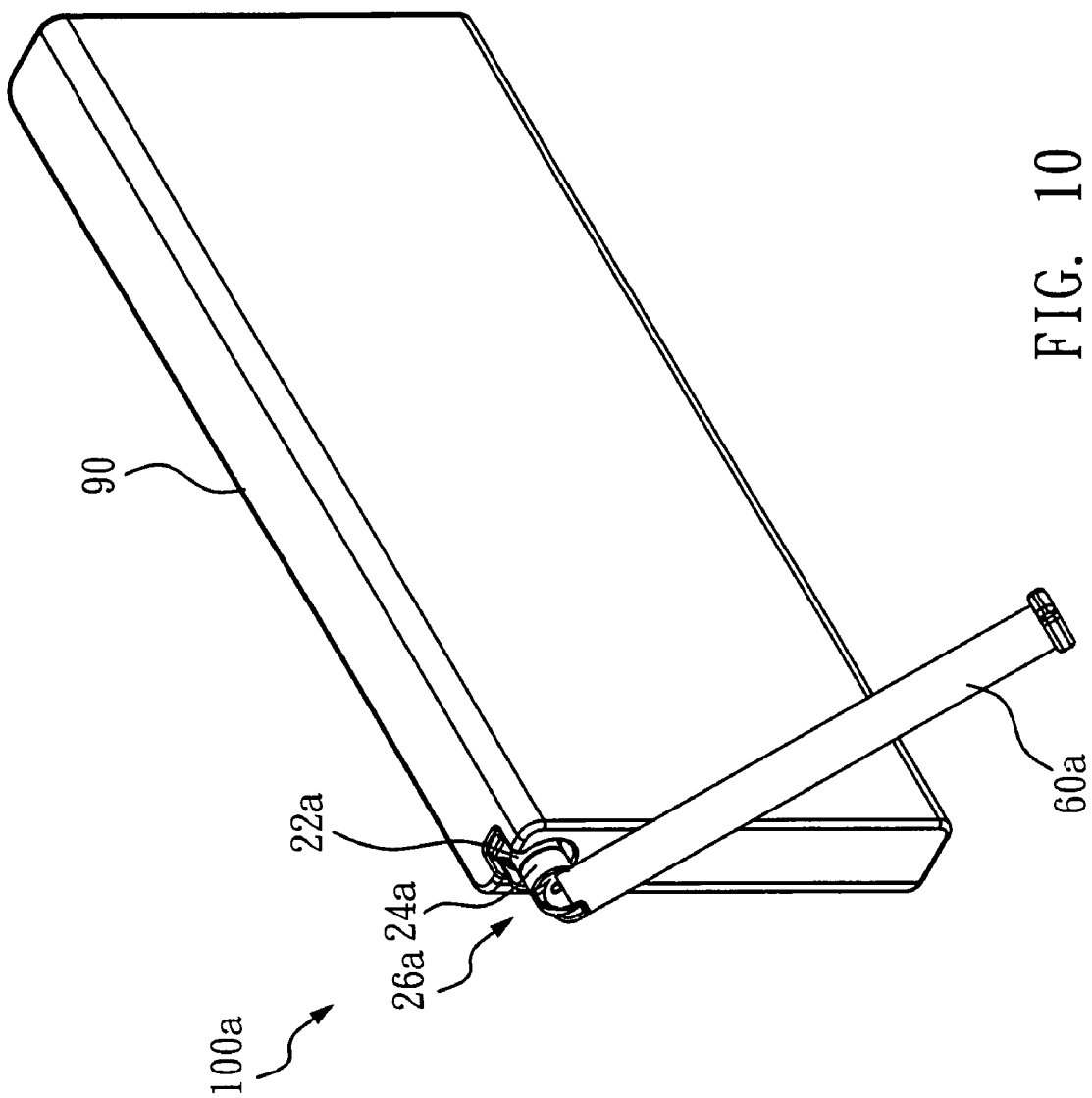
FIG. 10 is a 3-D diagram of the second embodiment of the invention which shows the shaft as a supporting leg.

The following section describes the method of using the supporting device 1a of the invention. Refer to FIG. 8 to FIG. 10. FIG. 8 is a 3-D diagram of the second embodiment of the invention which shows the main body being used as a touch pen. FIG. 9 is a 3-D diagram of the second embodiment of the invention which shows a shaft extended beyond the main body. FIG. 10 is a 3-D diagram of the second embodiment of the invention which shows the shaft as a supporting leg.

When the user requires the use of the main body 10a as a touch pen, the user must apply an outward force to the pressing section 19a of the main body 10a in order to detach the locking section 16a of the main body 10a from the clipping section 922 of the slot 92, so that the main body 10a can then be pulled out completely (as shown in FIG. 8). The shaft 60a is located in the sliding path 12a inside the main body 10. If the shaft 60a is to be used as a supporting leg, the user must apply an outward force to the pressing section 64a of the shaft 60a so as to pull the pressing section 64a outwards, without detaching the locking section 16a of the main body 10a from the clipping section 922.

Next, the shaft 60a and the rotating component 20a can slide along the sliding path 12a and exit from the opening 14a (as shown in FIG. 9). When the shaft 60a and the pivoting part 26a of the rotating component 20a lie outside the main body 10a, the shaft 60a will no longer be restrained by the sliding path 12a, and thus it will be able to freely rotate with respect to the main body 10a.

The user can then adjust the shaft 60a to a desired position (as shown in FIG. 10), forming an included angle between the shaft 60a and the second rotating unit 24a such that the device can be erected on a flat surface.

Figure 11:
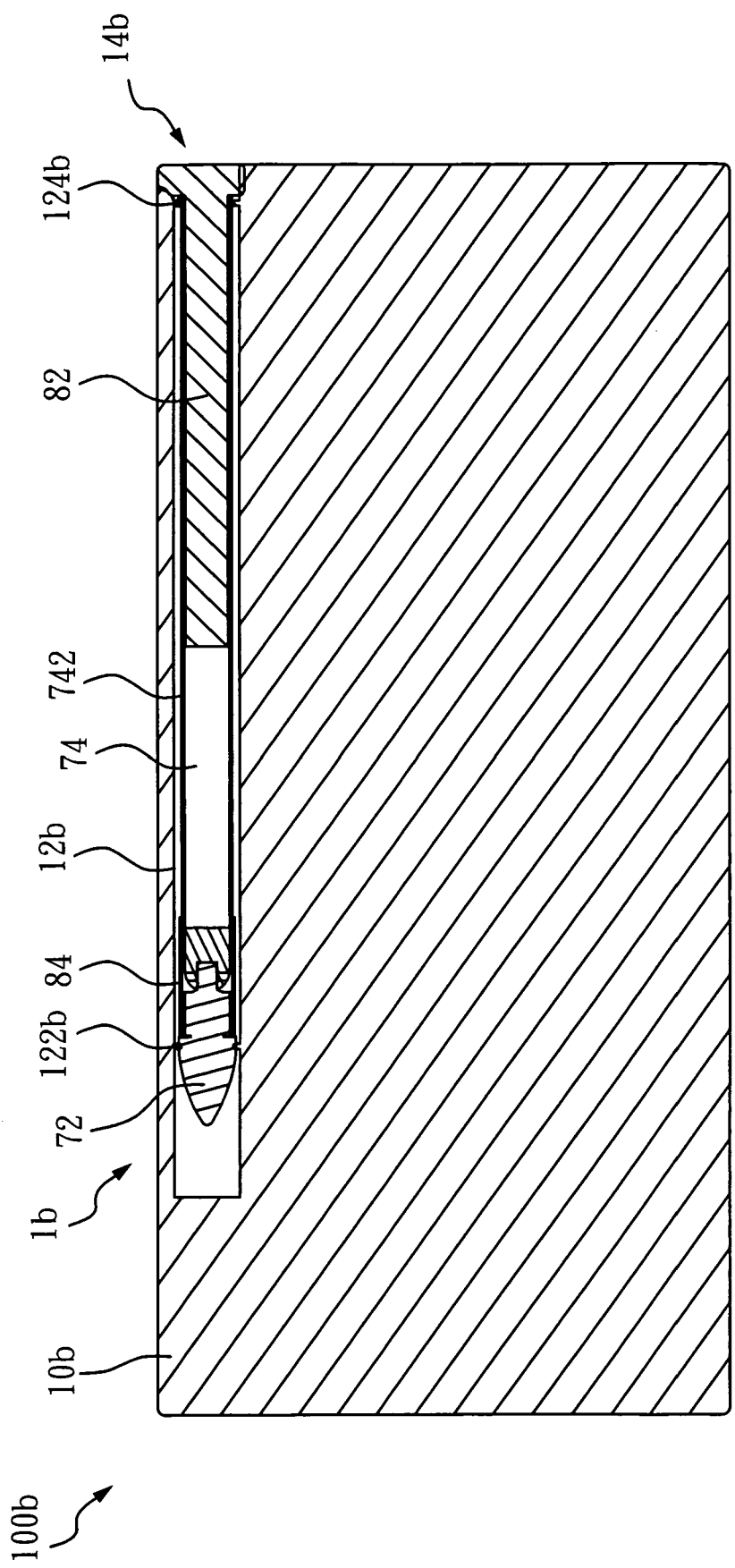
FIG. 11 is a cutaway diagram of the third embodiment of the invention which shows a supporting device.
Figure 12:
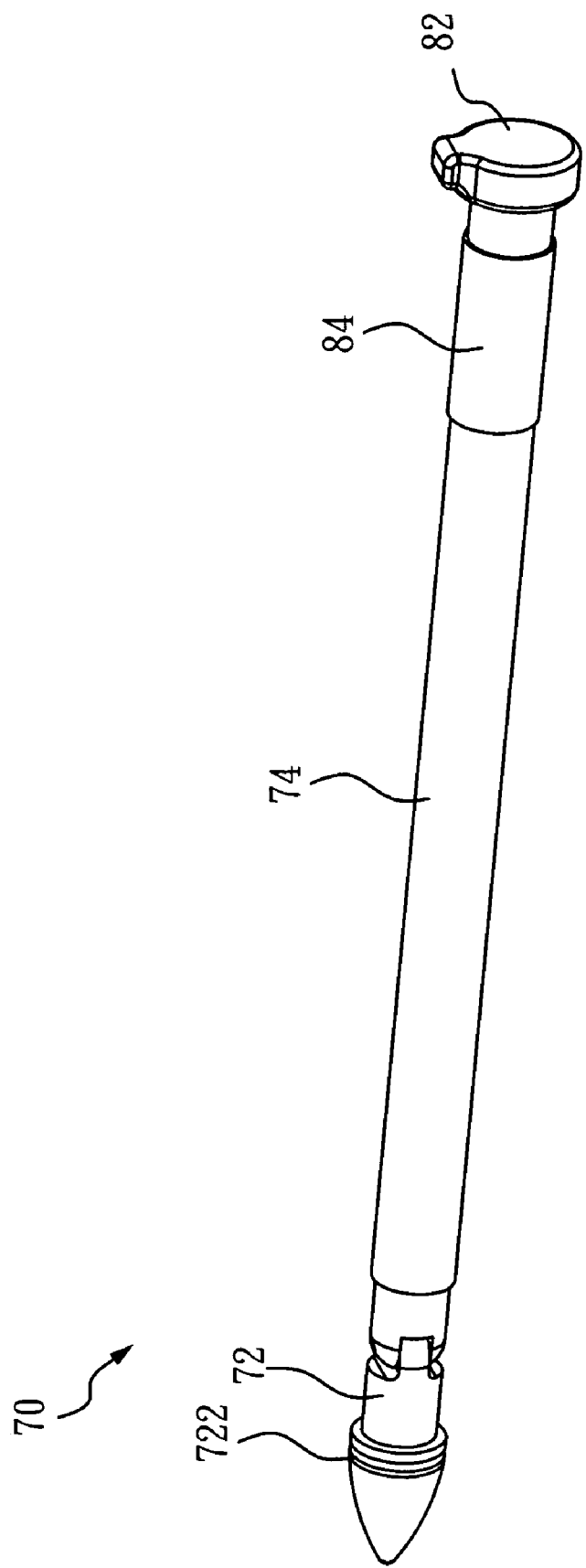
FIG. 12 is a 3-D diagram of the third embodiment of the invention which shows a touch pen.
Figure 13:
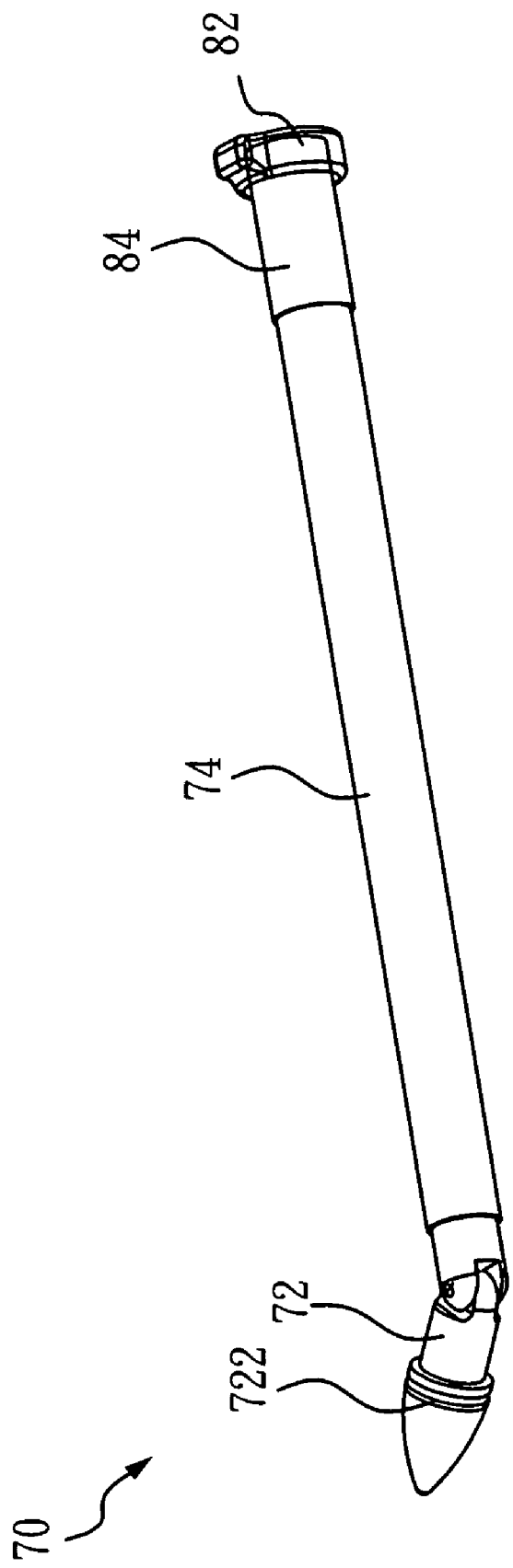
FIG. 13 is a 3-D diagram of the third embodiment of the invention which shows the rotation of the second shaft with respect to the first shaft of a touch pen.

Refer to FIG. 11 to FIG. 13. FIG. 11 is a cutaway diagram of the third embodiment of the invention which shows a supporting device. FIG. 12 is a 3-D diagram of the third embodiment of the invention that shows a touch pen. FIG. 13 is a 3-D diagram of the third embodiment of the invention which shows the rotation of the second shaft with respect to the first shaft of a touch pen. In the embodiment, the rotation is performed on the shaft of the touch pen.

The supporting device 1b can be used in the portable device 10b. The supporting device 1b comprises a main body 10b and a touch pen 70; the main body 10b comprises a sliding path 12b and an opening 14b; the sliding path 12b comprises a locking section 122b and a second locking section 124b; the locking sections are used to lock the touch pen 70 in different positions under different usages.

As shown in FIG. 12, the touch pen 70 comprises a first shaft 72 and a second shaft 74. The second shaft 74 of the touch pen 70 can be used as a supporting leg; therefore, the second shaft 74 is longer than the first shaft 72. The tip of the first shaft 72 includes a groove 722; the first shaft 72 can slide along the sliding path 12b, and the groove 722 can either be locked with the first locking section 122b or with the second locking section 124b. The second shaft 74 can slide along the sliding path 12b, and the second shaft 74 is pivoted to the first shaft 72.

When the groove 722 of the first shaft 72 is fixed with the first locking section 122b (as shown in FIG. 11), the touch pen 70 will then be entirely embedded in the sliding path 12b, and the touch pen will not be in use.

Figure 14:
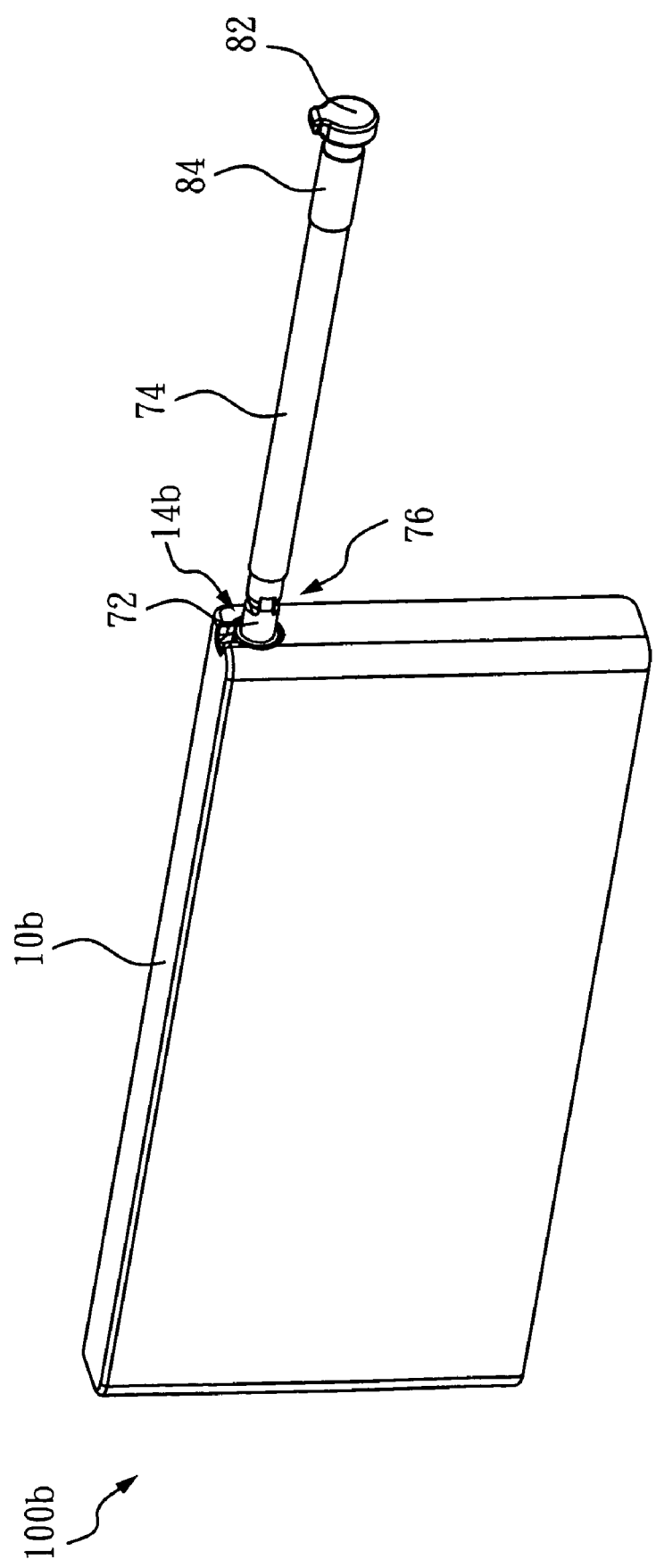
FIG. 14 is a 3-D diagram of the third embodiment of the invention which shows a touch pen extended beyond the main body.
Figure 15:
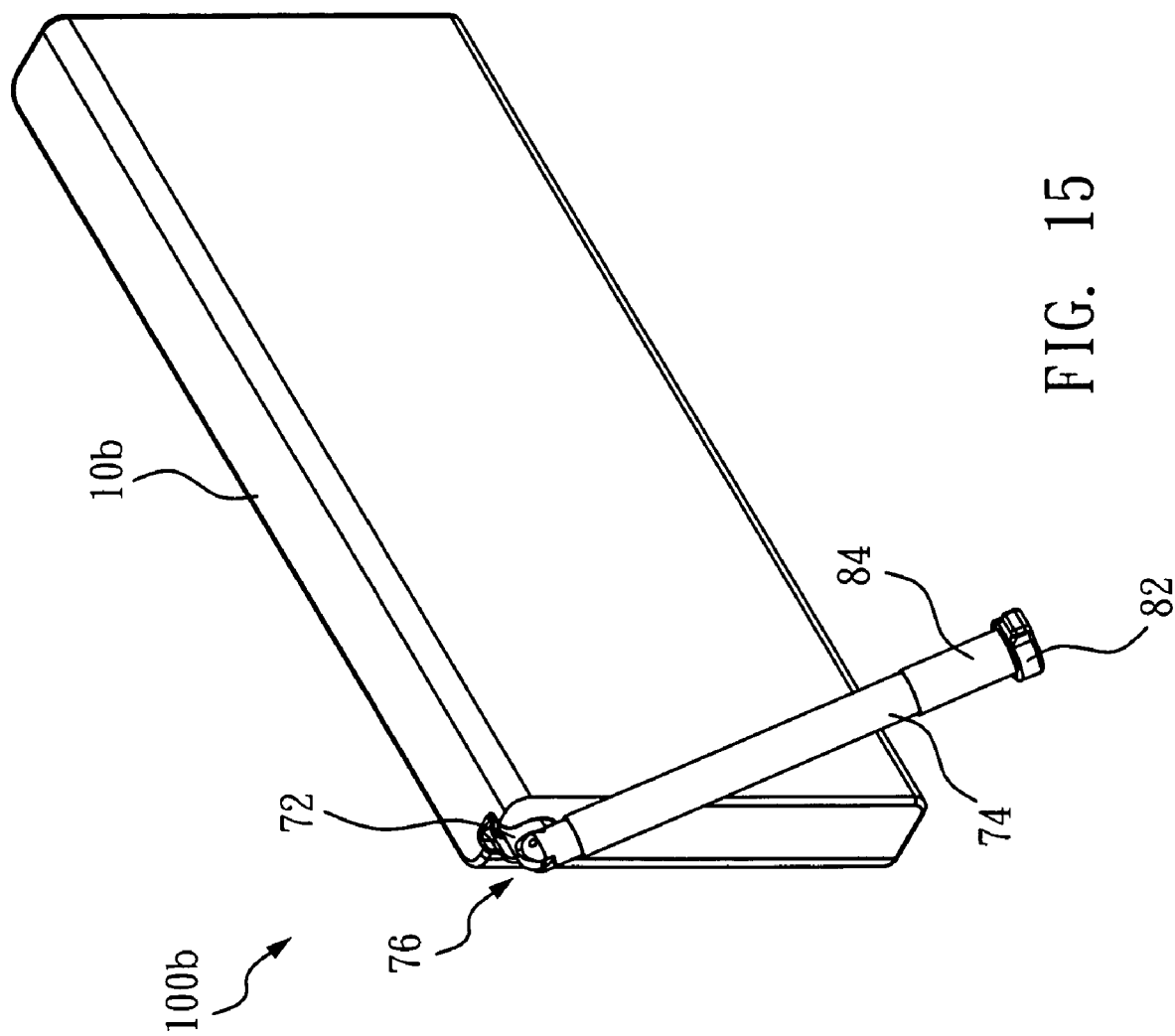
FIG. 15 is a 3-D diagram of the third embodiment of the invention which shows a touch pen being used as a supporting leg.

If the second shaft 74 is to be used as a supporting leg, then the groove 722 of the first shaft 72 will be locked at the second locking section 124b (as shown in FIG. 14). The second shaft 74 of the touch pen 70 and the pivot part 76 will then exit from the opening 14b and extend beyond the main body 10b; then the second shaft 74 can rotate with respect to the first shaft 72 into any desired position.

If the touch pen 70 is to be used as a touch pen, an outward force must be applied to the touch pen 70 in order to detach the connection between the groove 722 of the touch pen 70 and the second locking section 124b. The touch pen 70 can then be pulled out for use.

In the embodiment, the tail of the second shaft 74 comprises a stand 82. The stand 82 lies within the sliding path 742, and the sliding path 742 is inside the second shaft 74. The length of the stand 82 is adjustable to compensate for the length of the second shaft 74.

In order to prevent the first shaft 72 and the second shaft 74 from moving with respect to each other, the first shaft 72 and the second shaft 74 are covered with a covering element 84 (shown in FIG. 12), which enables them to slide along the first shaft 72 as well as the second shaft 74. When the covering element 84 moves to the joint between the first shaft 72 and the second shaft 74, the rotation movement is restricted by the covering element 84. Also, in order to enhance the supporting effect, the first shaft 72 and the second shaft 74 are joined together tightly.

Although the present invention has been explained in relation to its preferred embodiment, it is also of vital importance to acknowledge that many other possible modifications and variations can be made without departing from the spirit and scope of the invention as hereinafter claimed.

What is claimed is:

1. A supporting device for a portable electronic device, the supporting device comprising:
   a main body, wherein the main body comprises a sliding path and an opening internally;
   a shaft, wherein the shaft can slide along the sliding path; and
   a rotating component, wherein the rotating component is connected to the shaft and the rotating component can slide along the sliding path, wherein the shaft and at least a part of the rotating component can be extended beyond the main body through the opening; wherein the shaft can rotate with respect to the main body when the shaft and at least a part of the rotating component are extended beyond the main body, wherein the shaft is a touch pen and the main body is a casing of a portable electronic device, wherein the shaft further comprises a locking section, and the rotating component comprises a clipping section; the clipping section can be attached detachably from the locking section.

2. The supporting device as claimed in claim 1, wherein the rotating component comprises a first rotating unit and a second rotating unit; the first rotating unit can rotate inside the sliding path, whereas the second rotating unit can rotate with respect to the first rotating unit.

3. The supporting device as claimed in claim 2, wherein the first rotating unit and the second rotating unit are a tight fit.

4. A supporting device for a portable electronic device, the supporting device comprising:
   a main body, wherein the main body comprises a sliding path and an opening internally;
   a shaft, wherein the shaft can slide along the sliding path; and
   a rotating component, wherein the rotating component is connected to the shaft and the rotating component can slide along the sliding path, wherein the shaft and at least a part of the rotating component can be extended beyond the main body through the opening; wherein the shaft can rotate with respect to the main body when the shaft and at least a part of the rotating component are extended beyond the main body, wherein the shaft is a supporting leg and the main body is a touch pen, wherein the supporting device further comprises a casing of the portable electronic device, and the casing comprises a slot, the main body being able to slide along the slot; the main body comprises a locking section, and the slot comprises a clipping section; the clipping section can be attached detachably from the locking section, wherein the rotating component comprises a first rotating unit and a second rotating unit; the first rotating unit can rotate inside the sliding path, and the second rotating unit can rotate with respect to the first rotating unit.

5. The supporting device as claimed in claim 4, wherein the second rotating unit and the shaft are a tight fit.

6. A supporting device comprising:
   a main body, wherein the main body comprises a sliding path and an opening, wherein the sliding path comprises a first locking section and a second locking section; and
   a touch pen comprising:
   a first shaft, wherein the first shaft can slide along the sliding path and the first shaft can be locked at either the first locking section or at the second locking section; and
   a second shaft, wherein the second shaft can slide along the sliding path and the second shaft is pivoted to the first shaft; when the first shaft is locked at the second locking section, the second shaft will exit from the opening and extend beyond the main body, and then the second shaft can rotate with respect to the first shaft.

7. The supporting device as claimed in claim 6, further comprising a supporting leg, wherein the supporting leg is connected to the second shaft with an adjustable length.

8. The supporting device as claimed in claim 6, further comprising a covering element, wherein the covering element can slide along the first shaft and the second shaft.

9. The supporting device as claimed in claim 6, wherein the first shaft and the second shaft are a tight fit.

10. The supporting device as claimed in claim 6, wherein the first shaft further comprises a groove; the groove is used by the first shaft to be locked either at the first locking section or at the second locking section.

11. A portable electronic device including a supporting device, the supporting device comprising:
    a main body, wherein the main body comprises a sliding path and an opening internally;

a shaft, wherein the shaft can slide along the sliding path;
a rotating component, wherein the rotating component is connected to the shaft and the rotating component can be slid along the sliding path, wherein the shaft and at least a part of the rotating component can be extended beyond the main body through the opening; wherein the shaft can rotate with respect to the main body when the shaft and at least a part of the rotating component are extended beyond the main body, wherein the shaft is a touch pen, and the main body is a casing of a portable electronic device, wherein the shaft further comprises a locking section, and the rotating component comprises a clipping section; the clipping section can be attached detachably from the locking section, wherein the rotating component comprises a first rotating unit and a second rotating unit, wherein the first rotating unit can rotate inside the sliding path and the second rotating unit can rotate with respect to the first rotating unit.

* * * * *